(12) United States Patent
Turtinen et al.

(10) Patent No.: US 11,818,080 B2
(45) Date of Patent: *Nov. 14, 2023

(54) RANDOM ACCESS WITH BANDWIDTH PART SWITCH

(71) Applicant: NOKIA TECHNOLOGIES OY, Espoo (FI)

(72) Inventors: Samuli Turtinen, Ii (FI); Chunli Wu, Beijing (CN); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,559

(22) Filed: Jan. 14, 2022

(65) Prior Publication Data
US 2022/0140990 A1 May 5, 2022

Related U.S. Application Data

(63) Continuation of application No. 16/764,047, filed as application No. PCT/CN2017/111143 on Nov. 15, 2017, now Pat. No. 11,387,974.

(51) Int. Cl.
*H04L 5/00* (2006.01)
*H04W 76/27* (2018.01)
(Continued)

(52) U.S. Cl.
CPC .......... *H04L 5/0098* (2013.01); *H04L 5/0092* (2013.01); *H04W 74/02* (2013.01); *H04W 74/0833* (2013.01); *H04W 76/27* (2018.02)

(58) Field of Classification Search
CPC ..... H04L 5/0007; H04L 5/001; H04L 5/0092; H04L 5/0098; H04W 72/02; H04W 72/0453; H04W 74/02; H04W 74/0833
See application file for complete search history.

(56) References Cited

U.S. PATENT DOCUMENTS 9,591,668 B2  3/2017  Montojo et al.
9,930,699 B2  3/2018  Satattin et al.
(Continued)

FOREIGN PATENT DOCUMENTS

CN  102282902 A  12/2011
CN  103905378 A  7/2014
(Continued)

OTHER PUBLICATIONS

3GPP TS 36.321 V14.4.0, 3rd Generation Partnership Project; Technical Specification Group Radio Access Network; Evolved Universal Terrestrial Radio Access (E-UTRA); Medium Access Control (MAC) Protocol Specification (Release 14) (Sep. 2017) 108 pages.

(Continued)

*Primary Examiner* — Gary Mui
(74) *Attorney, Agent, or Firm* — ALSTON & BIRD LLP (57) ABSTRACT

Various communication systems may benefit from improved random access operations. For example, certain embodiments may benefit from improved random access in which multiple bandwidth parts are configured to a user equipment within one cell. A method, in certain embodiments, may include triggering a random access procedure at a user equipment. The method may also include switching at the user equipment from a first uplink bandwidth part that does not support a random access channel to a second uplink bandwidth part that has the random access channel configured after the triggering of the random access procedure. The switching may be autonomously performed by the user equipment. In addition, the method may include performing the random access procedure at the user equipment using the random access channel configured at the second uplink bandwidth part.

20 Claims, 2 Drawing Sheets

(51) Int. Cl.
  *H04W 74/02* (2009.01)
  *H04W 74/08* (2009.01)

(56) References Cited

U.S. PATENT DOCUMENTS

| | | | |
|---|---|---|---|
| 2009/0109937 | A1 | 4/2009 | Cave et al. |
| 2010/0260152 | A1 | 10/2010 | Englund et al. |
| 2010/0296467 | A1 | 11/2010 | Pelletier et al. |
| 2011/0274092 | A1 | 11/2011 | Liu et al. |
| 2012/0008600 | A1 | 1/2012 | Marinier et al. |
| 2013/0034069 | A1 | 2/2013 | Uemura |
| 2015/0003418 | A1 | 1/2015 | Rosa et al. |
| 2015/0113100 | A1 | 4/2015 | Tweedale et al. |
| 2015/0296559 | A1 | 10/2015 | Liu et al. |
| 2015/0327218 | A1 | 11/2015 | Kim |
| 2017/0280483 | A1 | 9/2017 | Liu et al. |
| 2019/0098655 | A1 | 3/2019 | Shih et al. |
| 2019/0104554 | A1 | 4/2019 | Amuru et al. |
| 2019/0141695 | A1 | 5/2019 | Babaei et al. |
| 2019/0364602 | A1 | 11/2019 | Yi et al. |
| 2020/0274750 | A1 | 8/2020 | Yi et al. |
| 2020/0288502 | A1 | 9/2020 | Lee et al. |
| 2020/0344034 | A1 | 10/2020 | Moon et al. |
| 2020/0351946 | A1 | 11/2020 | Pang et al. |
| 2021/0092008 | A1 | 3/2021 | Yi et al. |

FOREIGN PATENT DOCUMENTS

| | | |
|---|---|---|
| CN | 104838704 A | 8/2015 |
| CN | 105430750 A | 3/2016 |
| CN | 111279783 A | 6/2020 |
| CO | 6270281 A2 | 4/2011 |
| EP | 2552170 A1 | 1/2013 |
| EP | 3445123 A1 | 2/2019 |
| EP | 3571803 B1 | 11/2019 |
| EP | 3677086 A1 | 7/2020 |
| EP | 3681239 A1 | 7/2020 |
| EP | 3685618 A1 | 7/2020 |
| EP | 3685623 B1 | 7/2020 |
| EP | 3687228 A1 | 7/2020 |
| JP | 2011205242 A | 10/2011 |
| JP | 2012-525083 A | 10/2012 |
| KR | 10-2019-0086043 A | 7/2019 |
| KR | 10-2020-0051052 A | 5/2020 |
| RU | 2596802 C2 | 9/2016 |
| WO | WO 2010/082888 A1 | 7/2010 |
| WO | WO 2010/124228 A2 | 10/2010 |
| WO | WO 2011/116242 A1 | 9/2011 |
| WO | WO 2013/140240 A1 | 9/2013 |
| WO | WO 2015/085273 A1 | 6/2015 |
| WO | WO 2017/069593 A1 | 4/2017 |
| WO | WO 2019/051177 A1 | 3/2019 |
| WO | WO 2019/059729 A1 | 3/2019 |
| WO | WO 2019/066533 A1 | 4/2019 |
| WO | WO 2019/083277 A1 | 5/2019 |
| WO | WO 2019/094781 A2 | 5/2019 |
| WO | WO 2023/065279 A1 | 4/2023 |

OTHER PUBLICATIONS

3GPP TS 38.321 V1.0.0, 3rd Generation Partnership Project; Technical Specification Group Radio Access Network; NR; Medium Access Control (MAC) Protocol Specification (Release 15) (Sep. 2017) (including Presentation Page) 47 pages.
CATT, "Further Details on NR 4-Step RA Procedure", 3GPP TSG RAN WG1 Meeting #90bis, R1-1717803, (Oct. 9-13, 2017), 20 pages.
CATT, "PDSCH and PUSCH resource allocation", 3GPP TSG RAN WG1 Meeting 90bis, R1-717833, Oct. 3, 2017, [found Sep. 16, 2020], downloaded from the Internet at URL: https://www.3gpp.org/ftp/tsg_ran/WG1_RL1/TSGR1_90b/Docs/R1-1717833.zip.
Decision of Refusal for Japanese Application No. 2020-527096 dated Jan. 4, 2022, 6 pages.
Decision to Grant for Russian Application No. 2020115932/07 dated Nov. 23, 2020, 12 pages.
Extended European Search Report for European Application No. 17932473.6 dated May 31, 2021, 8 pages.
Huawei et al., "User Plane Impacts for Bandwidth Parts", 3GPP TSG-RAN WG2 #99bis, Prague, CZ, Oct. 9-13, 2017; R2-1710217.
International Search Report and Written Opinion for Application No. PCT/CN2017/111143 dated Jul. 31, 2018, 6 pages.
MediaTek Inc., "Summary of Offline Discussion on Bandwidth Part Operation", 3GPP TSG RAN WG1 Meeting NR#3, R1-1716832, (Sep. 18-21, 2017), 7 pages.
Nokia et al, "Remaining details on PRACH procedure", 3GPP TSG RAN WG1 Meeting 90bis, R1-1718303, Oct. 2, 2011, [found Sep. 16, 2020], downloaded from the Internet at URL: http://www.3gpp.org/ftp/TSG_RAN/WG1_RL1/TSGR1_90b/Docs/R1-1718303.zip.
Nokia et al, "SR procedure for NR", 3GPP TSG-RAN WG2 #99bis, R2-1710817, Sep. 28, 2017, [found Sep. 16, 2020], downloaded from the Internet at URL: https://www.3gpp.org/ftp/TSG_RAN/WG2_RL2/TSGR2_99bis/Docs/R2-1710817.zip.
Non-Final Office Action for U.S. Appl. No. 16/764,047 dated Jun. 16, 2021.
Notice of Acceptance for Australian Application No. 2017439921 dated Nov. 9, 2021, 3 pages.
Notice of Allowance for Taiwan Application No. 107132690 dated Sep. 27, 2019, 3 pages.
Notice of Allowance for U.S. Appl. No. 16/764,047 dated Feb. 28, 2022.
Notice of Allowance for U.S. Appl. No. 16/764,047 dated Oct. 15, 2021.
NTT Docomo, Inc., "Work Plan for Rel-15 NR WI", 3GPP TSG RAN WG1 Meeting #90bis, R1-1718177, (Oct. 9-13, 2017), 176 pages.
Office Action and Search Report for Chile Application No. 202001288 dated Oct. 12, 2021, 11 pages.
Office Action for ARIPO Application No. AP/P/2020/012399 dated Nov. 18, 2021, 4 pages.
Office Action for Australian Application No. 2017439921 dated Nov. 11, 2020, 4 pages.
Office Action for Australian Application No. 2017439921 dated Sep. 27, 2021, 3 pages.
Office Action for Canadian Application No. 3,082,698 dated Jun. 14, 2021, 3 pages.
Office Action for Chinese Application No. 201780096868.8 dated Apr. 6, 2022, 16 pages.
Office Action for Indian Application No. 202047023675 dated Nov. 8, 2021, 6 pages.
Office Action for Indonesia Application No. P00202003504 dated Jul. 27, 2021, 11 pages.
Office Action for Japanese Application No. 2020-527096 dated Apr. 28, 2021, 10 pages.
Office Action for Korean Application No. 10-2020-7015881 dated Feb. 8, 2022, 13 pages.
Office Action for Korean Application No. 10-2020-7015881 dated Jul. 19, 2021, 19 pages.
Office Action for Taiwan Application No. 107132690 dated Jul. 10, 2019, 14 pages.
Office Action for Vietnam Application No. 1-2020-02784 dated Sep. 25, 2020, 2 pages.
PDSCH and PUSCH Resource Allocation, 3GPP TSG RAN WG1 Meeting 90bis, R1-1717833 (Oct. 2017) 9 pages.
Remaining Details on PRACH Procedure, 3GPP TSG RAN WG1 Meeting 90bis, R1-1718303 (Oct. 2017) 11 pages.
Russian Office Action and Search Report for Russian Patent Application No. 2020115932/07(026106), filed Nov. 15, 2017.
Samsung, "Random Access in RRC Connected: Bandwidth Part Aspects", 3GPP TSG-RAN WG2 #99bis, R2-1710091, (Oct. 9-13, 2017), 3 pages.
SR Procedure for NR, 3GPP TSG-RAN WG2 #99bis, R2-1710817 (Oct. 2017) 6 pages.
U.S. Appl. No. 16/764,047, filed May 14, 2020, U.S. Pat. No. 11,387,974, Patented.

(56) References Cited

OTHER PUBLICATIONS

"3rd Generation Partnership Project; Technical Specification Group Radio Access Network; NR; Medium Access Control (MAC) protocol specification (Release 15)", 3GPP TS 38.321 v15.7.0, (Sep. 2019), 78 pages.
"LS on BWP Related Agreements", 3GPP TSG-RAN WG1 Meeting #91, R1-1721522, (Nov. 27-Dec. 1, 2017), 2 pages.
Decision to Grant for ARIPO Application No. AP/P/2020/012399 dated Jun. 15, 2022, 5 pages.
Decision to Grant for Japanese Application No. 2020-527096 dated Aug. 15, 2022, 4 pages.
Ericsson, "Random Access on Non-Anchor Carriers in NB-IoT", 3GPP TSG-RAN WG1 #86, R1-167431, (Aug. 22-26, 2016), 4 pages.
Huawei et al, "Remaining Issues on Initial DL/UL Active Bandwidth Part", 3GPP TSG RAN WG1 Meeting #91, R1-1719379, (Nov. 27-Dec. 1, 2017), 3 pages.
Huawei et al., "On Initial Active Bandwidth Part", 3GPP TSG RAN WG1 Meeting 90bis, R1-1717057, (Oct. 9-13, 2017), 4 pages.
Huawei et al., "Remaining Issues on the PRACH for SUL", 3GPP TSG RAN WG1 Meeting 90bis, R1-1717901, (Oct. 9-13, 2017), 5 pages.
Nokia et al., "On Rate-Matching in NR", 3GPP TSG-RAN WG1 NR#90bis, R1-1718609, (Oct. 9-13, 2017), 8 pages.
Nokia et al., "On Remaining Aspects of BWPs", 3GPP TSG-RAN WG1 Meeting #90bis, R1-1718607, (Oct. 9-13, 2017), 6 pages.
Notice of Allowance for Chilean Application No. 2020-001288 dated Apr. 14, 2022, 4 pages.
NTT Docomo, Inc., "Views on Other Aspect on Carrier Aggregation", 3GPP TSG RAN WG1 Meeting 90bis, R1-1718224, (Oct. 9-13, 2017), 3 pages.
Office Action for Indonesian Application No. P00202003504 dated Aug. 1, 2022, 7 pages.
Panasonic, "Numerology for Msg2 and Msg4 for RRC_Connected UEs", 3GPP TSG-RAN WG1 Meeting 90bis, R1-1718764, (Oct. 9-13, 2017), 4 pages.
Qualcomm Incorporated, "Open Issues on BWP", 3GPP TSG RAN WG1 #91, R1-1720693, (Nov. 27-Dec. 1, 2017), 15 pages.
Notice of Allowance for Chinese Application No. 201780096868.8 dated Jan. 3, 2023, 12 pages.
Notice of Allowance for Korean Application No. 10-2020-7015881 dated Nov. 18, 2022, 3 pages.
Decision to Grant for Japanese Application No. 2022-076727 dated May 23, 2023, 4 pages.
Office Action for Brazilian Application No. BR112020009624-5 dated Jul. 4, 2023, 8 pages.
Office Action for Colombian Application No. NC2020/0005810 dated Jun. 23, 2023, 10 pages.

RANDOM ACCESS WITH BANDWIDTH PART SWITCH

CROSS REFERENCE TO RELATED APPLICATION

This application is a continuation of U.S. application Ser. No. 16/764,047, filed May 14, 2020, which is a national phase entry of International Application No. PCT/CN2017/111143, filed Nov. 15, 2017, the entire contents of which are incorporated herein by reference.

BACKGROUND

Field

Various communication systems may benefit from improved random access operations. For example, certain embodiments may benefit from improved random access in which multiple bandwidth parts are configured to a user equipment within one cell.

Description of the Related Art

In Third Generation Partnership Project (3GPP) technology, such as Long Term Evolution (LTE) and LTE Advanced (LTE-A), a user equipment (UE) can begin accessing network services once the UE is synchronized with the network. Random access procedure is generally used to synchronize the UE with the network in the uplink direction via a physical random access channel (PRACH). The random access procedure may be either a contention-based random access procedure or a non-contention/contention-free random access procedure.

A contention-based random access procedure may be used when multiple UEs attempt to simultaneously access the network. The contention-based random access procedure may be used to resolve the potential collisions between the multiple UEs, while also synchronizing the UEs with the network. This contention-based random access procedure may include four separate messages transmitted between the UE and the network. The UE initially sends a first message with a random access channel preamble that includes a random access radio network temporary identity (RA-RNTI). The network entity then decodes the received RA-RNTI, and responds by transmitting a random access response in a second message. The random access response generally includes a temporary cell radio network temporary identity (C-RNTI), a timing advance value, and an uplink grant resource.

The UE uses that timing advance value to synchronize with the network, and transmits a radio resource control (RRC) connection request using the temporary C-RNTI, in a third message. The UE also includes a random value or a temporary mobile subscriber identity (TMSI) in the third message, which may be used by the network to determine a new C-RNTI, in case the temporary C-RNTI was assigned to multiple UEs. The network entity may then respond with a contention resolution message or an RRC connection setup message that includes the new C-RNTI. The new C-RNTI will be used by both the UE and the network entity to exchange data with one another for as long as the UE remains in a connected RRC state.

A system bandwidth in a given cell, which is used for both downlink and uplink transmissions by the network entity and UE, may be divided into one or more bandwidth parts. For a paired spectrum the downlink and uplink bandwidth parts (BWPs) are configured separately and independently for a UE in each serving cell. A paired spectrum is characterized by a block of spectrum in a lower frequency band that is associated with a block of spectrum in an upper frequency band using Frequency Division Duplex (FDD). For an unpaired spectrum that utilizes a Time Division Duplex (TDD), on the other hand, downlink BWPs and uplink BWPs are jointly configured as a pair, while sharing the same center frequency.

In a primary cell, for example, the random access channel can be configured on each uplink BWP, and each downlink BWP has to have a common search space (CSS) for the random access response. If some BWPs of the primary cell is not configured with RACH, at least the initial BWP will support the random access channel. In 3GPP fifth generation (5G) or New Radio (NR) technology, the number of scheduling requests may be counted. When the number of scheduling requests is equal to or exceeds a scheduling request transmission maximum, the user equipment may initiate a random access procedure, similar to the LTE or LTE-A.

SUMMARY

According to certain embodiments, an apparatus may include at least one memory including computer program code, and at least one processor. The at least one memory and the computer program code may be configured, with the at least one processor, to cause the apparatus at least to trigger a random access procedure at a user equipment. The at least one memory and the computer program code may also be configured, with the at least one processor, to cause the apparatus at least to switch from a first uplink bandwidth part that does not support a random access channel to a second uplink bandwidth part that has the random access channel configured after the triggering of the random access procedure. The switch may be autonomously performed by the apparatus. In addition, the at least one memory and the computer program code may be configured, with the at least one processor, to cause the apparatus at least to perform the random access procedure using the random access channel configured at the second uplink bandwidth part.

A method, in certain embodiments, may include triggering a random access procedure at a user equipment. The method may also include switching at the user equipment from a first uplink bandwidth part that does not support a random access channel to a second uplink bandwidth part that has the random access channel configured after the triggering of the random access procedure. The switching may be autonomously performed by the user equipment. In addition, the method may include performing the random access procedure at the user equipment using the random access channel configured at the second uplink bandwidth part.

An apparatus, in certain embodiments, may include means include triggering a random access procedure at a user equipment. The apparatus also includes means for switching at the user equipment from a first uplink bandwidth part that does not support a random access channel to a second uplink bandwidth part that has the random access channel configured after the triggering of the random access procedure. The switching may be autonomously performed by the user equipment. In addition, the apparatus may include means for performing the random access procedure at the user equipment using the random access channel configured at the second uplink bandwidth part.

According to certain embodiments, a non-transitory computer-readable medium encoding instructions that, when executed in hardware, perform a process. The process may include triggering a random access procedure at a user equipment. The process may also switching at the user equipment from a first uplink bandwidth part that does not support a random access channel to a second uplink bandwidth part that has the random access channel configured after the triggering of the random access procedure. The switching may be autonomously performed by the user equipment. In addition, the process may include performing the random access procedure at the user equipment using the random access channel configured at the second uplink bandwidth part.

According to certain other embodiments, a computer program product may encode instructions for performing a process. The process may include triggering a random access procedure at a user equipment. The process may also switching at the user equipment from a first uplink bandwidth part that does not support a random access channel to a second uplink bandwidth part that has the random access channel configured after the triggering of the random access procedure. The switching may be autonomously performed by the user equipment. In addition, the process may include performing the random access procedure at the user equipment using the random access channel configured at the second uplink bandwidth part.

BRIEF DESCRIPTION OF THE DRAWINGS

For proper understanding of the invention, reference should be made to the accompanying drawings, wherein.

DETAILED DESCRIPTION

Certain embodiments may include beam failure detection. When beam failure is detected, the UE may transmit a beam recovery request. The beam recovery request may be triggered or initiated when the number of consecutive detected beam failure instances exceeds a given threshold. The threshold, for example, may be defined as a block error rate (BLER). Some embodiments may have either one or more thresholds. In a multiple threshold embodiment, for example, one threshold may be directed to the synchronization signal block (SSB), while the other threshold may be for channel state information reference signal (CSI-RS). In NR technology, a network entity, such as a 5G or NR NodeB (gNB), may uniquely identify the user equipment from a beam failure recovery request using a PRACH sequence provided to UE by the network.

In order to determine dedicated PRACH resources for beam failure recovery, certain parameters related to the UE may be configured. For example, preamble sequence related parameters, such as a root sequence, cyclic shift, and/or a preamble index may be set. In another example, the maximum number of transmissions, maximum number of power rampings, target received power, retransmission power ramping step size, and/or a beam failure recovery timer of the UE may be configured. In some embodiments, dedicated PRACH resource parameters may also be configured. For example, frequency location information, time location, and/or associated SSB or CSI-RS information. When the beam failure triggering is met, the UE may transmit a dedicated PRACH preamble to recover the link via a random access procedure.

In some embodiments, only a subset of the total uplink bandwidth parts may support a random access procedure via a PRACH, also referred to as a random access channel (RACH) hereinafter. The UE may therefore be restricted to performing random access procedures towards a primary cell (PCell) or a primary secondary cell (PSCell) in only a subset of uplink bandwidth parts. Certain embodiments may allow a UE in an RRC connected mode to deal with the UE based triggers for random access procedure when the network is not aware of such an event. In other words, the UE may be allowed to autonomously trigger a random access procedure, even if the current active BWP, which may be referred to as a first uplink BWP, does not support a random access channel.

For example, when the random access procedure is triggered by the UE, and the currently active BWP does not support a random access channel, certain embodiments allow the UE to autonomously switch to another uplink BWP, which may be referred to as a second uplink BWP, that has the random access channel configured. The UE autonomously performing the switch may mean that the switch may be performed without any knowledge or involvement from the network. Because the current active BWP does not support and/or is not configured for a RACH, the network may not be aware that the UE is attempting to initiate a random access procedure. The first uplink BWP and the second uplink BWP may be different.

Figure 1:
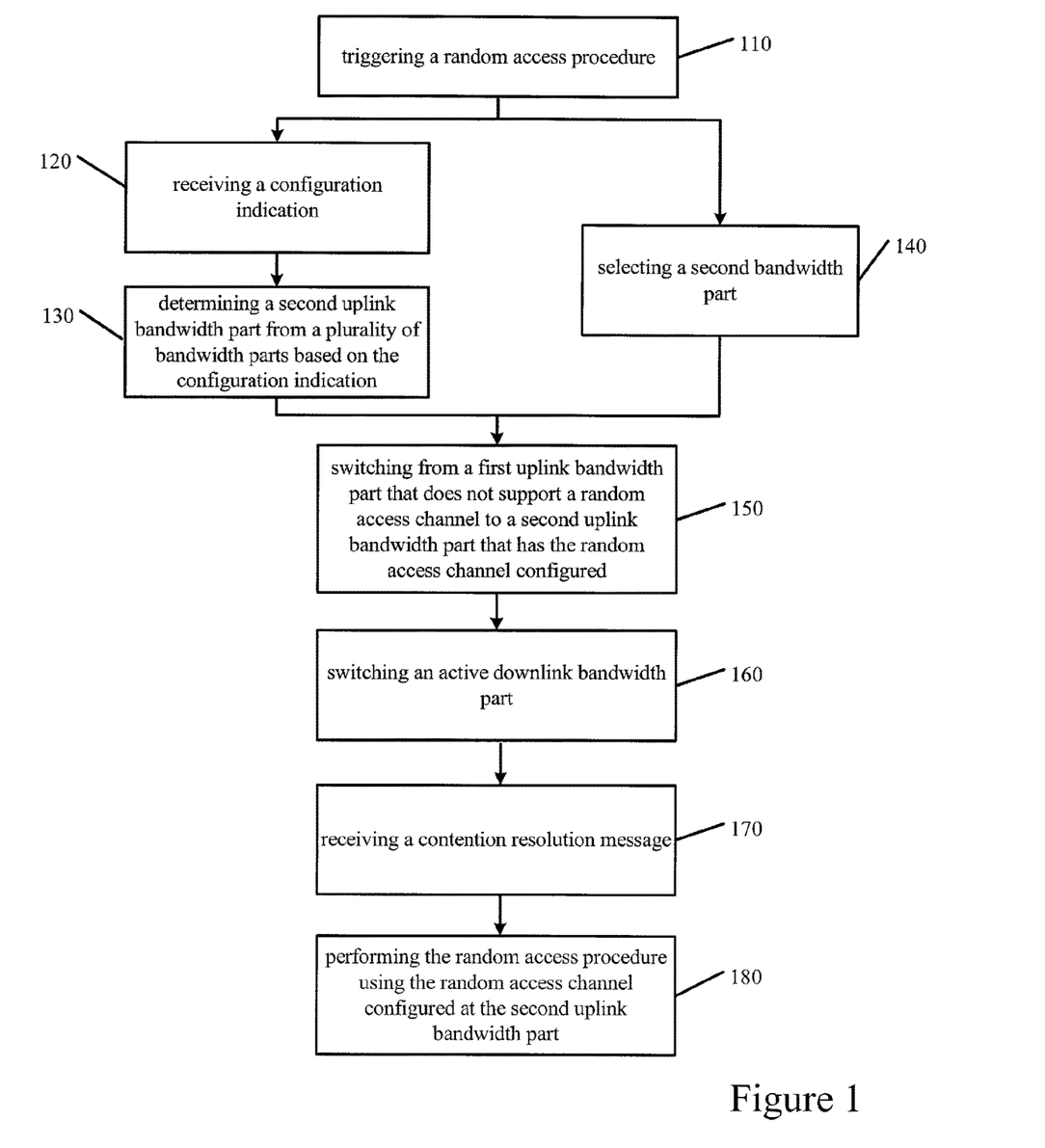
FIG. 1 illustrates an example of a flow diagram according to certain embodiments.

FIG. 1 illustrates an example of a flow diagram according to certain embodiments. In particular, FIG. 1 illustrates an example of a user equipment performing a method or process. In step 110, the UE may trigger a random access procedure. The random access procedures may be triggered via a RACH. The UE may be in a RRC connected state during the triggering of the random access procedure. As shown in step 150, the UE may switch from a first uplink BWP that does not support a random access channel to a second uplink BWP that has the random access channel configured. In other words, the second uplink BWP may already have a configured RACH.

In certain embodiments, in which multiple uplink BWPs support a random access channel, a network entity, such as gNB, may determine in which uplink BWP the UE should initiate the random access channel. The plurality of BWPs may be configured to the UE within a single cell. The network entity may, for example, be included in a PCell or a PSCell. The network entity may transmit the determination of the uplink BWP to the UE as part of a configuration indication. As shown in step 120, the UE may receive a configuration indication from the network entity. Based on the configured indication, the UE may select the second uplink BWP from a plurality of BWPs, as shown in step 130. In some other embodiments, the UE may receive the configuration information from the network entity, as shown in step 120, before the triggering of the random access procedure in step 110.

In other embodiments, the another or the second uplink bandwidth part may be determined by the UE, without an indicated configuration from the network entity, as shown in step 140. For example, the second uplink bandwidth part may be determined by the UE based on at least one of a numerology and/or a frequency of the random access channel. Numerology may be a subcarrier spacing. NR technology supports multiple numerology options related to multiple subcarrier spacing. The subcarrier spacing may be, for example, 15, 30, 60, 120, and 240 kilohertz (kHz). The UE may determine the second BWP based on any of the above multiple numerology options and/or a frequency utilized by the BWP. In some embodiments, the UE may be configured at least with a default BWP from the plurality of BWPs. The UE may determine the second BWP based on whether it is a default BWP.

As discussed above, in step 140 the user equipment selects the second uplink BWP. In some embodiments, the second BWP may be selected based on an implementation of the UE and/or selected based on a default and/or an initial BWP. The default and/or initial BWP may be configured for other purposes, such as power saving, and may be used as a fall back for the RACH. A selection based on the implementation of the UE may mean that it is up to the UE implementation to select a BWP of the cell that has a RACH configured. In yet another embodiment, the UE may select the second BWP based on a logical channel that triggers the random access procedure, or a priority of the logical channel. For example, some logical channels may be restricted to be mapped to an uplink channel with certain subcarrier spacing, and hence a BWP with a RACH supporting the certain subcarrier spacing to which the logical channel is restricted may be prioritized.

Once the second BWP part is selected, as shown in step 140, the user equipment may switch equipment from a first uplink bandwidth part that does not support a random access channel to second uplink bandwidth part that has the random access channel configured, as shown in step 150. The switch from the first uplink bandwidth part to the second uplink bandwidth part may be autonomously performed by the user equipment. In some embodiments, the network may not even be aware that the UE is performing random access procedure. The switching illustrated in step 150 may include the UE autonomously deactivating the first uplink BWP and activating the second uplink BWP.

In certain embodiments, one or more uplink carriers may share the same uplink timing alignment, and may be grouped together within the same Timing Advance Group (TAG). In order to prevent the UE from transmitting any uplink signals other than the ones related to the random access procedure, time alignment timer (TAT) may be considered expired. In some embodiments, the TAT may be associated with a TAG that includes the first BWP and the second BWP. In other words, to prevent the transmitting of any signals on the first BWP, the TAT associated with the TAG comprising the first BWP and/or the second BWP may be considered expired. The UE may therefore not be able to transmit any signals on the first BWP until it receives a new timing advance value from the network. The new timing advance value may be received through random access procedure upon which the timing alignment timer is started again. The signals the UE may attempt to transmit on the first BWP, for example, may be in response to a downlink assignment or an uplink grant received at the UE from a network entity that is unaware of the ongoing random access procedure.

In step 160, the UE may switch an active downlink BWP together with the switching from the first uplink bandwidth part to the second uplink bandwidth part shown in step 150. For example, when the triggered random access procedure is a contention-based random access procedure, an active downlink BWP is switched together with the switching from the first uplink BWP to the second uplink BWP. The contention-based random access procedure may be triggered, for example, when reaching a maximum number of scheduling requests in the Medium Access Control (MAC) layer. The switching of the active downlink BWP together with the second uplink BWP may be performed so that the downlink BWP may correspond to the BWP in which the UE expects to receive the random access response from the network entity. Because the network may not be able to identify the UE from the received preamble, the random access response may need to be transmitted in a known downlink BWP. Such a downlink BWP may be at least one of the downlink BWPs having a CSS.

On the other hand, certain embodiments may utilize a contention-free random access procedure. This random access procedure, for example, may be triggered after a beam failure being detected by the UE, or after a beam recovery request is transmitted by the UE. In the contention-free random access procedure, the UE may switch an active downlink BWP together with the switching of the first uplink bandwidth part to the second uplink bandwidth part, similar to the contention-based random access procedure. In other embodiments, however, the UE may retain the current downlink BWP in a contention-free random access procedure, regardless of the first uplink BWP is switched.

In certain embodiments, whether the UE will switch or retain the downlink BWP in a contention-free random access procedure may be configured by the network or a network entity therein. The network, in such embodiments, may identify the UE from the received preamble, and may be able to respond in an earlier downlink BWP. Some embodiments, in which the network determines the retaining or the switching of the downlink BWP, may be used in a paired spectrum where the downlink and uplink BWPs are independently configured or switched. In some embodiments, the earlier downlink BWP may have a CSS, while in some other embodiments of the earlier downlink BWP may only have a UE-specific search space (USS).

In step 170, the UE may receive a contention resolution message from a network entity as part of the random access procedure. The contention resolution message is the fourth message in the contention-based random access procedure. The switching of at least one of the uplink BWP and/or the downlink BWP may occur upon the receiving of the contention resolution message at the UE. In some embodiments, the contention resolution message is transmitted addressed directly to the UE's C-RNTI, in which case the switching of at least one of the uplink BWP and/or the downlink BWP may be enforced. In step 180, the UE may perform the random access procedure using the random access channel configured at the second uplink bandwidth part. The embodiments discussed help to prevent erroneous network scheduling when the UE has already triggered a random access procedure. This will reduce the amount of resources used by the network, thereby improving the functioning of the network as a whole, and the network entities included within the network.

Figure 2:
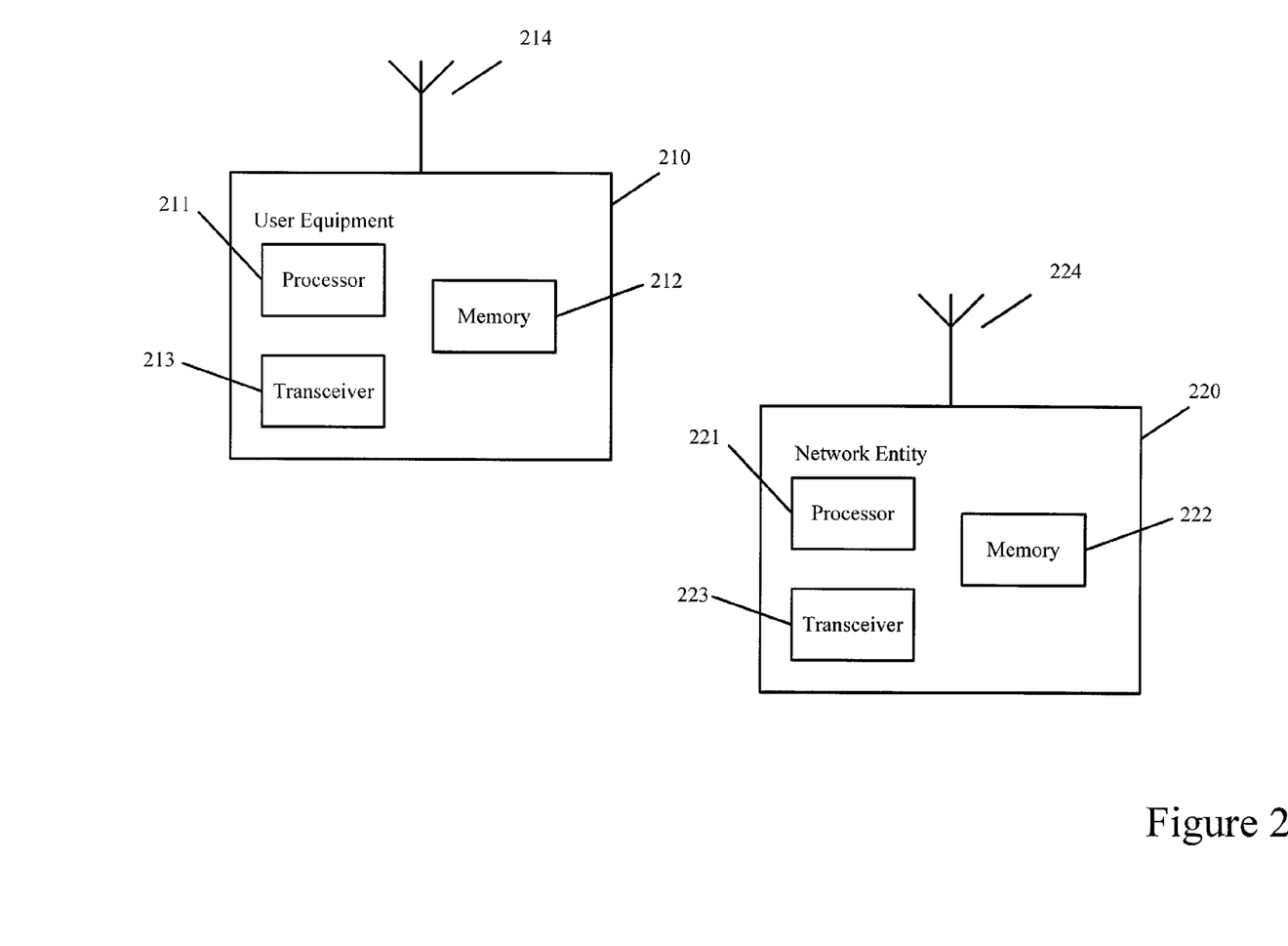
FIG. 2 illustrates an example of a system according to certain embodiments.

FIG. 2 illustrates a system according to certain embodiments. It should be understood that each block in FIG. 1 may be implemented by various means or their combinations, such as hardware, software, firmware, one or more processors and/or circuitry. In one embodiment, a system may include several devices, such as, for example, a network entity 220 or a UE 210. The system may include more than one UE 210 and more one network entity 220, although only one network entity is shown for the purposes of illustration. The network entity may be a network node, an access node, a base station, an evolved NodeB (eNB), a gNB, a server, a host, or any of the other access or network node discussed herein.

Each of these devices may include at least one processor or control unit or module, respectively indicated as 211 and 221. At least one memory may be provided in each device, and indicated as 212 and 222, respectively. The memory may include computer program instructions or computer code contained therein. One or more transceiver 213 and 223 may be provided, and each device may also include an antenna, respectively illustrated as 214 and 224. Although only one antenna each is shown, many antennas and multiple antenna elements may be provided to each of the devices. Higher category UEs generally include multiple antenna panels. Other configurations of these devices, for example, may be provided. For example, network entity 220 and UE 210 may be additionally configured for wired communication, in addition to wireless communication, and in such a case antennas 214 and 224 may illustrate any form of communication hardware, without being limited to merely an antenna.

Transceivers 213 and 223 may each, independently, be a transmitter, a receiver, or both a transmitter and a receiver, or a unit or device that may be configured both for transmission and reception. In other embodiments, the UAVs or the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the UE may be a machine type communication (MTC) device or an Internet of Things device, which may not require human interaction, such as a sensor, a meter, or an actuator. The method and/or process illustrated in FIG. 1 may be performed by user equipment 210.

In some embodiments, an apparatus, such as user equipment 210 or network entity 220, may include means for carrying out embodiments described above in relation to FIG. 1. In certain embodiments, at least one memory including computer program code can be configured to, with the at least one processor, cause the apparatus at least to perform any of the processes described herein. The apparatus, for example, may be user equipment 210 or network entity 220.

Processors 211 and 221 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 212 and 222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 220 or UE 210, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 2 illustrates a system including a network entity 220 and UE 210, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 210 may likewise be provided with a variety of configurations for communication other than communication network entity 220. For example, the UE 210 may be configured for device-to-device, machine-to-machine, and/or vehicle-to-vehicle transmission.

The above embodiments may provide for significant improvements to the functioning of a network and/or to the functioning of the user equipment and the network entities included within the network. Specifically, certain embodiments may allow a user equipment to perform a random access procedure, even when the active or first uplink BWP does not support a random access channel. The UE may switch the first uplink BWP to a second BWP that has the random access channel configured. Doing so will help to prevent errors in which the network may schedule a UE who already failed a scheduling request, and/or a UE that already triggered a random access procedure.

Preventing such erroneous scheduling will help to reduce the resources utilized by the network, thereby significantly improving the efficiency and throughput of the network as a whole. This improved efficiency will not only improve the functioning of the network entities included within the network, but will also significantly improve the functioning of the user equipment by preventing unnecessary transmissions. For example, reducing unnecessary transmissions with the network can help to reduce the amount of battery drained by the user equipment.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although many of the above embodiments are directed to 3GPP 5G or NR technology, the embodiments may apply to any other 3GPP technology, such as $4^{th}$ generation (4G), $3^{rd}$ generation (3G), LTE, LTE-A, and/or Internet of Things.

PARTIAL GLOSSARY

3GPP Third Generation Partnership Project
5G Fifth Generation
NR New Radio
gNB NR Node B
UE User Equipment
LTE Long Term Evolution
LTE-A LTE Advanced
PRACH Physical Random Access Channel
RA-RNTI Random Access Radio Network Temporary Identity
C-RNTI Cell Radio Network Temporary Identity
RRC Radio Resource Control
TMSI Temporary Mobile Subscriber Identity
FDD Frequency Division Duplex
BWPs Bandwidth Parts
TDD Time Division Duplex
CSS Common Search Space
USS UE-specific Search Space
BLER Block Error Ratio
SSB Synchronization Signal Block
CSI-RS Channel State Information Reference Signal
PCell Primary Cell
PSCell Primary Secondary Cell
TAG Timing Advance Group

What is claimed is:

1. A method comprising:
triggering a random access procedure at a user equipment to which a first uplink bandwidth part and a second uplink bandwidth part are configured in a cell,
wherein the first uplink bandwidth part does not support a random access channel for the random access procedure and the second uplink bandwidth part supports the random access channel for the random access procedure;
switching at the user equipment from the first uplink bandwidth part to the second uplink bandwidth part after the triggering of the random access procedure, wherein the switching is autonomously performed by the user equipment, and wherein the switching comprises the user equipment autonomously deactivating the first uplink bandwidth part and activating the second uplink bandwidth part; and
performing the random access procedure at the user equipment using the random access channel configured at the second uplink bandwidth part.

2. The method according to claim 1, further comprising:
switching at the user equipment an active downlink bandwidth part together with the switching from the first uplink bandwidth part to the second uplink bandwidth part.

3. The method according to claim 1, wherein a network entity is included in a primary cell or a secondary cell.

4. The method according to claim 1, further comprising:
selecting at the user equipment the second uplink bandwidth part based on at least one of an implementation of the user equipment, a default bandwidth part, a logical channel that triggers the random access procedure, or a priority of the logical channel.

5. The method according to claim 1, wherein to the user equipment multiple uplink bandwidth parts supporting the random access channel are configured in the cell.

6. The method according to claim 1, wherein the second uplink bandwidth part is an initial bandwidth part.

7. An apparatus comprising:
at least one processor; and
at least one memory including computer program code,
wherein the at least one memory and the computer program code are configured to, with the at least one processor, cause the apparatus at least to perform a process, the process comprising:
trigger a random access procedure at the apparatus to which a first uplink bandwidth part and a second uplink bandwidth part are configured in a cell,
wherein the first uplink bandwidth part does not support a random access channel for the random access procedure and the second uplink bandwidth part supports the random access channel for the random access procedure;
switch at the apparatus from the first uplink bandwidth part to the second uplink bandwidth part after the triggering of the random access procedure, wherein the switching is autonomously performed by the apparatus, and wherein the switch comprises the apparatus autonomously deactivating the first uplink bandwidth part and activating the second uplink bandwidth part; and
perform the random access procedure at the apparatus using the random access channel configured at the second uplink bandwidth part.

8. The apparatus according to claim 7, wherein the at least one memory and the computer program code are configured to, with the at least one processor, cause the apparatus at least to:
switch at the apparatus an active downlink bandwidth part together with the switching from the first uplink bandwidth part to the second uplink bandwidth part.

9. The apparatus according to claim 8, wherein the switching of the active downlink bandwidth part occurs when the triggered random access procedure is at least one of a contention-based random access procedure or a contention-free random access procedure.

10. The apparatus according to claim 7, wherein the at least one memory and the computer program code are configured to, with the at least one processor, cause the apparatus at least to:
receive a configuration indication at the apparatus from a network entity; and select the second uplink bandwidth part from a plurality of bandwidth parts based on the configuration indication.

11. The apparatus according to claim 10, wherein the first uplink bandwidth part and the second uplink bandwidth part are configured to the apparatus within the cell.

12. The apparatus according to claim 7, wherein the at least one memory and the computer program code are configured to, with the at least one processor, cause the apparatus at least to:
select the second uplink bandwidth part based on at least one of an implementation of the apparatus, a default bandwidth part, a logical channel that triggers the random access procedure, or a priority of the logical channel.

13. The apparatus according to claim 7, wherein the apparatus is in a radio resource control connected state during the triggering of the random access procedure.

14. The apparatus according to claim 7, wherein a time alignment timer is considered expired.

15. The apparatus according to claim 10, wherein the network entity is included in a primary cell or a secondary cell.

16. The apparatus according to claim 7, wherein the at least one memory and the computer program code are configured to, with the at least one processor, cause the apparatus at least to:
select at the apparatus the second uplink bandwidth part based on at least one of a numerology or a frequency of the random access channel.

17. The apparatus according to claim 7, wherein the triggering of the random access procedure occurs after a beam failure is detected by the apparatus.

18. The apparatus according to claim 7, wherein to the apparatus multiple uplink bandwidth parts supporting the random access channel are configured in the cell.

19. The apparatus according to claim 7, wherein the second uplink bandwidth part is an initial bandwidth part.

20. A computer program product comprising a non-transitory computer-readable medium bearing computer program code embodied therein for use with a computer, the computer program code comprising:
code for triggering a random access procedure at a user equipment to which a first uplink bandwidth part and a second uplink bandwidth part are configured in a cell, wherein the first uplink bandwidth part does not support a random access channel for the random access procedure and the second uplink bandwidth part supports the random access channel for the random access procedure;
code for switching at the user equipment from the first uplink bandwidth part to the second uplink bandwidth part after the triggering of the random access procedure, wherein the switching is autonomously performed by the user equipment, and wherein the switching comprises the user equipment autonomously deactivating the first uplink bandwidth part and activating the second uplink bandwidth part; and
code for performing the random access procedure at the user equipment using the random access channel configured at the second uplink bandwidth part.

* * * * *